United States Patent [19]

Foral

[11] Patent Number: 4,660,046
[45] Date of Patent: Apr. 21, 1987

[54] SINGLE POWER SOURCE DATA TRANSMISSION SYSTEM

[76] Inventor: Marvin J. Foral, 75 Springs Dr., Doylestown, Pa. 18901

[21] Appl. No.: 616,037

[22] Filed: Jun. 1, 1984

[51] Int. Cl.[4] .............................................. G01S 13/52
[52] U.S. Cl. ........................................ 342/160; 342/6
[58] Field of Search ..................... 343/7.7, 6.5 SS, 6.8, 343/5 SA, 18 D, 18 B

[56] References Cited

U.S. PATENT DOCUMENTS

| B 484,029 | 2/1976 | Rittenbach | 343/5.5 SA |
| 2,133,615 | 10/1938 | Gerhard | 343/18 D |
| 2,917,740 | 12/1959 | Ramsay | 343/18 D |
| 3,019,430 | 1/1962 | Pedersen et al. | 343/18 D |
| 3,258,737 | 6/1966 | Ciavaglia | 343/18 D |
| 3,371,345 | 2/1968 | Lewis | 343/18 D |
| 3,836,962 | 9/1974 | Zaleski | 343/18 D |

Primary Examiner—Stephen C. Buczinski
Assistant Examiner—Donald E. Hayes, Jr.
Attorney, Agent, or Firm—Robert F. Beers; Henry Hansen

[57] ABSTRACT

A flat plate reflector at one station, responsive to ambient vibrations, is illuminated by a narrow beam of radio frequency waves transmitted from a second location, the transmitted waves being modulated in direct proportion to the ambient vibrations and reflected back to the second station for analysis.

3 Claims, 1 Drawing Figure

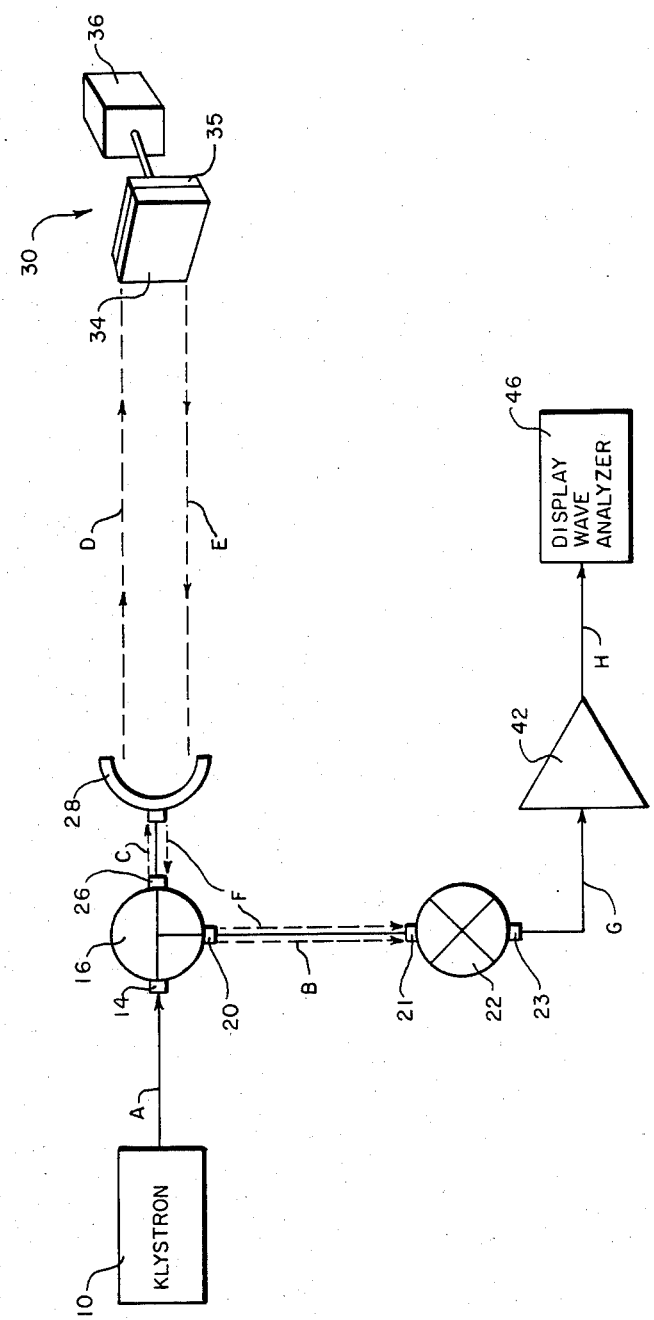

SINGLE POWER SOURCE DATA TRANSMISSION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to data transmission systems and more particularly to a communication system for transmitting information from a remote location on reflected radiant energy transmitted from another location.

Most known data transmission systems involve remote stations that are active; that is, the return signal with its attendant information is radiated from a remote station-mounted transmitter. Such systems are quite advantageous in some respects since the return signal is transmitted directly and is, thus, not subject to substantial attenuation nor to fluctuation inherent in the typical backscatter signal. However, active systems are not without disadvantages, primary among which are relative system complexity and cost, the likelihood of interference from other remote stations similarly situated, ease of detection, and the requirement of significant power.

Passive data transmission systems, i.e., systems which the return signal is merely a reflection of the signal transmitted, have overcome the problems of complexity, cost and detection, but have generally failed to solve the problem of specific remote station identification. Furthermore, these systems still require a source of power at the remote station in order to modulate the incident rf energy by rotating, oscillating, or vibrating the remote station's reflective surface.

SUMMARY OF THE INVENTION

Accordingly, it is a general purpose and object of the present invention to provide a data transmission system which is is simple and secure.

Another object of the present invention is to provide a system suitable for covert data transmission.

A further object of the present invention is to provide a data transmission system which requires power only at the receiving end of the information link.

Still a further object is to provide a data transmission system which minimizes interference caused by similarly situated data sources.

Briefly, these and other objects of the present invention are accomplished by a single power source data transmission system, comprising, in general, a signal source and a data source. The signal source includes a klystron for providing a constant rf signal to the input port of a waveguide circulator, where the signal is split with a small portion (called the reference signal) passing through one port to a mixer and the rest passing through another port for radiation from a narrow beam antenna. So radiated, the signal is directed towards a data source, including a highly-reflective flat plate and means for providing mechanical motion thereto, where, due solely to ambient vibrations, the source signal is modulated and reflected back to the signal source. Upon reception, the signal so reflected passes through the circulator and is combined with the reference signal in the mixer to produce the difference frequency which is subsequently amplified and analyzed to determine the information passed.

Other objects, advantages and novel features of the invention will become apparent from the following detailed description of the invention when considered with the accompanying drawing wherein:

BRIEF DESCRIPTION OF THE DRAWING

The sole FIGURE is a schematic of a single power source transmission system according to the invention.

DESCRIPTION OF THE PREFERRED EMBODIMENT

In accordance with the present invention, klystron 10 provides a constant rf signal A for the system. Signal A is applied to input port 14 of a waveguide circulator 16, the signal being split therein with approximatley 1% (reference signal B) passing through output port 20 into port 21 of a microwave mixer 22 and the rest (signal C) with a small amount of attenuation passing through port 26. Thereafter, signal C is applied to a narrow beam antenna 28 where it is radiated as signal D in the direction of a data source 30.

Oriented in a direction normal to signal D of antenna 28, a flat plate 34, made of a highly-reflective, very thin gauge material (such as aluminum foil) bonded about its periphery to a rigid, porours backing 35, is mounted on a base 36 in such a manner that mechanical motion, i.e., vibrations caused by local seismic or acoustic activity, is transmitted thereto. Because of the highly reflective surface and orientation of flat plate 34, signal D will be modulated by the vibrations and reflected as signal E back to antenna 28, passing through port 26 of circulator 16, and thence, as signal F with little attenuation, through port 20 into mixer 22.

Within mixer 22 reference signal B is combined with reflected signal F, resulting in signal G at port 23 which is indicative of the difference frequency. Signal G is then applied to an amplifier 42, the amplified signal H subsequently passing to a display wave analyzer 46 for determination of the information from data source 30.

Having described in some detail the structural features of the invention, the operation and use of the system will now be set forth. If flat plate 34 is at rest, reflected signal F will be the same frequency as reference signal B and difference frequency signal G will be zero. However, if due to seismic or acoustic activity mechanical motion is applied to flat 34, that motion will cause the foil to vibrate in a direction along the axis of signal D and will appear as frequency modulation on reflected signal F. As a result, reflected signal F so modulated will result in a difference frequency when combined with reference signal B in mixer 22. The resulting difference frequency can then be analyzed to determine the characteristic motion applied to data source 30.

In the situation where several data sources 30 are located at respective points, each with flat plate 34 normal to signal D, information may be individually obtained by illuminating the respective point. Because of the narrowness of the beam of signal D and the relative orientation of data source 30, only that signal reflected from the illuminated data source will be received for analysis. If that, or any other data source, is illuminated by a power source at another location, the reflected signal would be extremely small and virtually undetectable.

Therefore, it is now apparent that a simple and secure data transmission system, suitable for covert operation and requiring but a single power source at the receiving end of the information link, is attainable in a system wherein rf energy generated at and transmitted from one location is received at a remote location, modulated solely by ambient vibrations, and the rf energy so modulated reflected for reception and analysis at the transmitting location.

Obviously, many modifications and variations of the present invention are possible in light of the above teachings. It is therefore to be understood that within the scope of the appended claims the invention may be practiced otherwise than as specifically described.

What is claimed is:

1. A single power source data transmission system, comprising:
   a source of constant radio frequency energy;
   antenna means at a first station operatively connected to said source for receiving a major portion of the energy therefrom for transmission within a narrow beam, and for receiving radio frequency energy propagated within the beam;
   a reflective flat plate at a second station remote from said first station positioned in a plane normal to the direction of the beam for reflecting the transmitted energy back toward said antenna means, the reflected energy being modulated at a frequency in direct proportion to vibrations of said plate; and
   processing means, operatively connected to said source and said antenna means receiving the remaining portion of the energy from said source and the reflected energy for determining the modulating frequency.

2. A data transmission system according to claim 1, wherein said antenna means further comprises:
   a circulator operatively connected for directing approximately 99% of the energy from said source to said antenna means and approximately 1% to an output port, and for directing all of the reflected energy received from said plate to said port.

3. A data transmission system according to claim 2, wherein said processing means further comprises:
   a mixer having two inputs connected to said output port of said circulator and a common output for determining the difference frequency between the energy transmitted from and reflected back to said narrow beam antenna;
   an amplifier connected to the output of said mixer; and
   means, adapted to receive the amplified signal from said amplifier, for analyzing the difference frequency.

* * * * *